United States Patent [19]
Tyau

[11] 3,803,497
[45] Apr. 9, 1974

[54] SYSTEM FOR PRODUCING, ON A SINGLE OUTPUT LEAD, A SINGLE PULSE TRAIN HAVING A NUMBER OF PULSES EQUAL TO THE TOTAL NUMBER OF PULSES GENERATED BY ALL OF A PLURALITY OF ASYNCHRONOUS PULSE SOURCES

[75] Inventor: Walter Fah Mim Tyau, Orange, Calif.

[73] Assignee: International Telephone and Telegraph Corporation, New York, N.Y.

[22] Filed: Aug. 28, 1972

[21] Appl. No.: 284,125

[52] U.S. Cl. ......... 328/104, 235/92 ST, 235/92 FL, 307/220, 307/243, 328/61, 328/154, 340/150
[51] Int. Cl. ............................................ H03k 17/02
[58] Field of Search ............ 307/220, 223, 232, 243, 307/260, 262, 269, 296; 328/59–61, 63, 104, 154; 235/92 ST, 92 FL; 340/150

[56] References Cited
UNITED STATES PATENTS

| | | |
|---|---|---|
| 2,906,869 | 9/1959 | Kramskoy ...................... 328/154 X |
| 3,078,378 | 2/1963 | Burley et al. ...................... 307/217 |
| 3,358,237 | 12/1967 | Houle .............................. 328/104 |
| 3,061,815 | 10/1962 | Tomes .............................. 307/261 |
| 3,188,520 | 6/1965 | Beaume .......................... 307/226 |
| 3,249,769 | 5/1966 | Mierendorf ..................... 307/296 |
| 3,324,241 | 6/1967 | Bachelet ......................... 307/293 |
| 3,586,877 | 6/1971 | Aridas ............................ 307/261 |
| 3,675,049 | 7/1972 | Haven ............................ 307/293 |

Primary Examiner—Stanley D. Miller, Jr.
Attorney, Agent, or Firm—A. Donald Stolzy

[57] ABSTRACT

A pulse train is formed having a pulse for each output pulse of a plurality of turbine meters, for example. The problem solved is that of losing a pulse when there is coincidence. The turbine meters produce pulses at variable asynchronous rates. This problem is solved by using a secondary pulse generator and divider for plural pulse trains of a pulse repetition frequency (PRf) higher (by at least six times) than the highest expected combined total turbine meter PRF. The turbine meters' pulses are stored and the secondary pulses gated out in succession.

4 Claims, 7 Drawing Figures

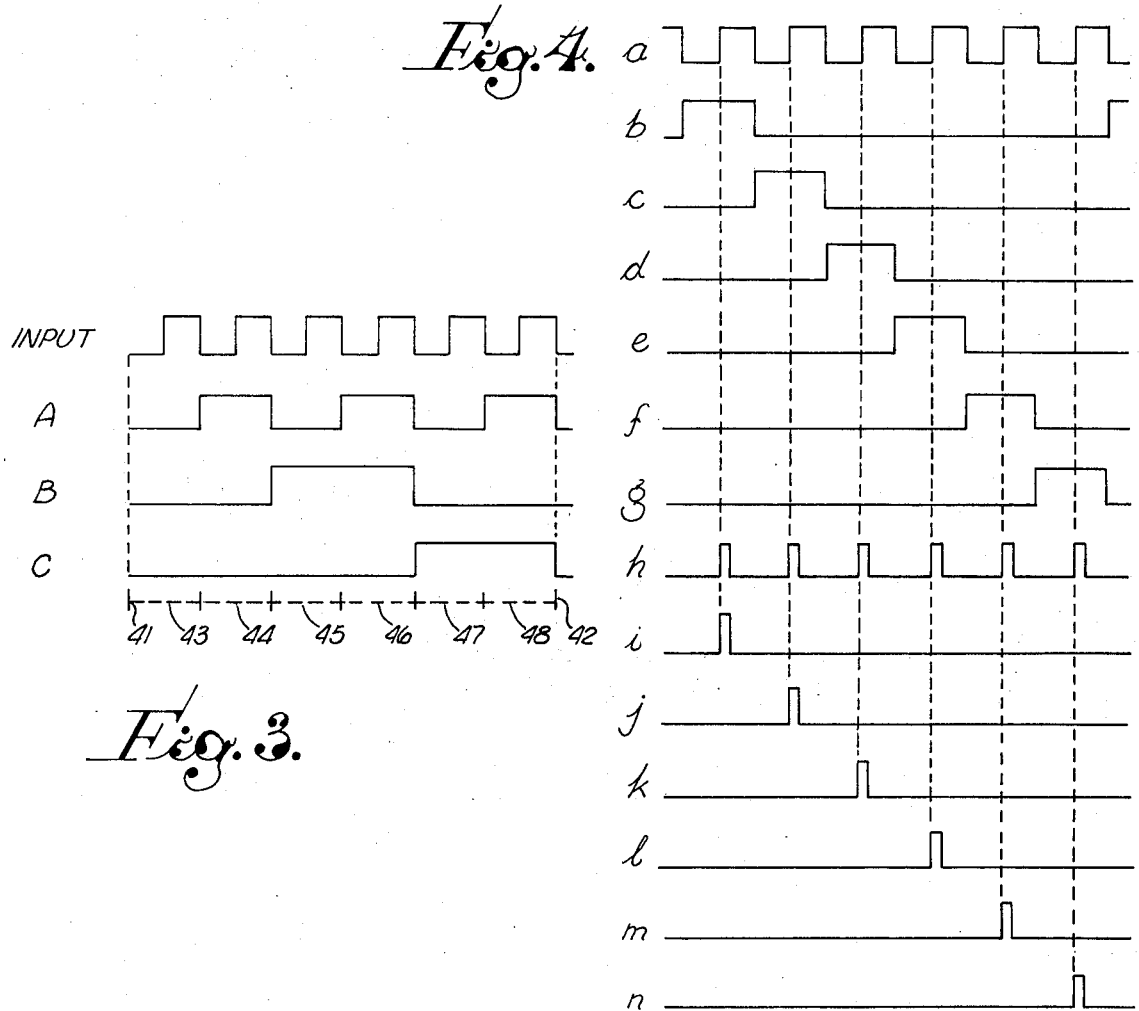
Fig. 4.
Fig. 3.
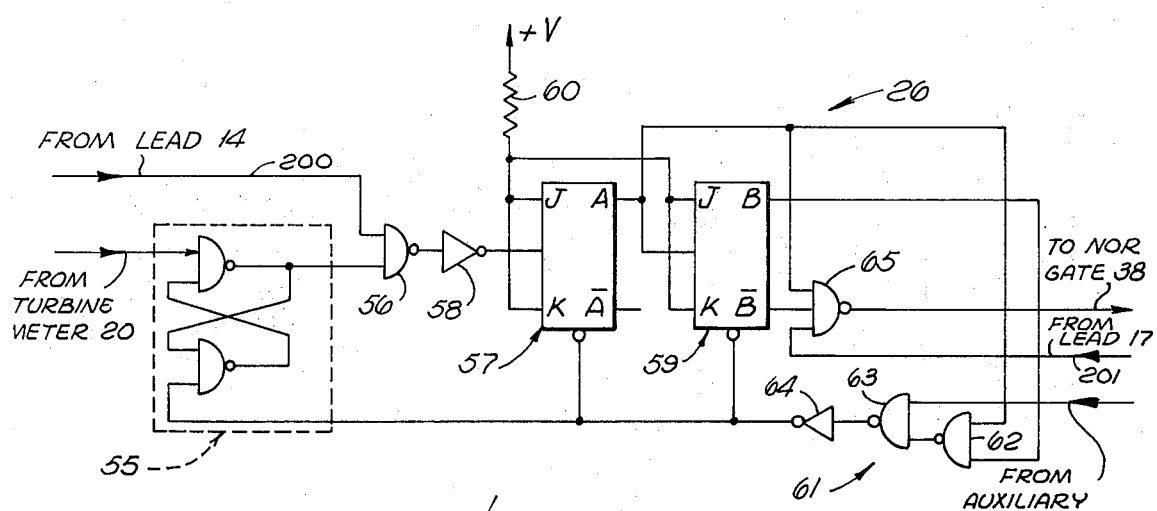
Fig. 5.

3,803,497

SYSTEM FOR PRODUCING, ON A SINGLE OUTPUT LEAD, A SINGLE PULSE TRAIN HAVING A NUMBER OF PULSES EQUAL TO THE TOTAL NUMBER OF PULSES GENERATED BY ALL OF A PLURALITY OF ASYNCHRONOUS PULSE SOURCES

BACKGROUND OF THE INVENTION

This invention relates to pulse combining apparatus, and more particularly, to means for producing a pulse train having a number of pulses equal to the sum of the pulses in a plurality of a synchronous pulse trains.

In the prior art, it has been the practice to measure the total oil or gas flow from several wells in one field and then to add them together. Unfortunately, no means has been provided to measure the entire flow from a whole field.

SUMMARY OF THE INVENTION

In accordance with the system of the present invention, the above-described and other disadvantages of the prior art overcome by combining a synchronously generated pulses in spaced relation in a single pulse train.

Thus, a turbine meter at each well may produce a pulse train. The turbine meter pulses are then periodically stored, and a higher frequency source provides pulses which are gated out according to the stored pulses. The pulses gated out will then, in number, represent the total flow from field.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIGS. 3 and 4 are graphs of groups of waveforms characteristic of the operation of the invention;

FIG. 5 is a more detailed block diagram of one of the blocks shown in FIG. 1;

DESCRIPTION OF THE PREFERRED EMBODIMENT

Figure 1:
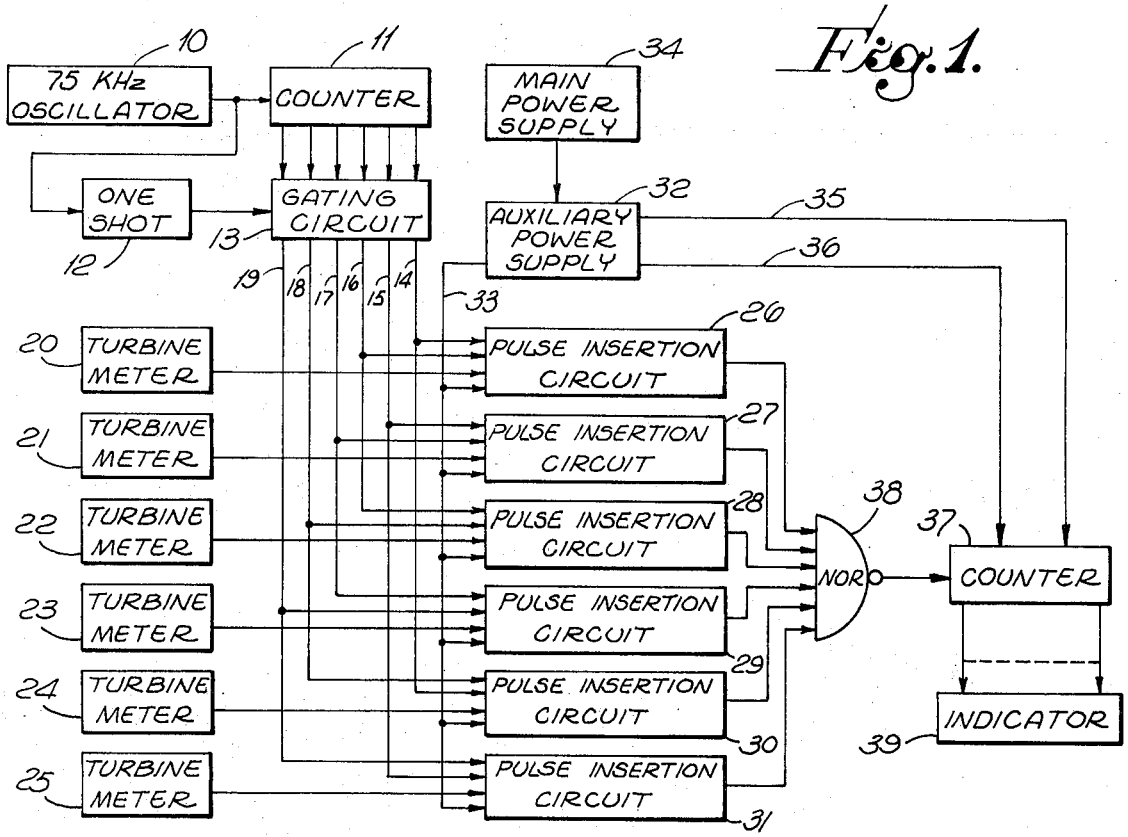
FIG. 1 is a block diagram of one system constructed in accordance with the present invention.

In FIG. 1, a 75 kilohertz oscillator is indicated at 10 having an output which is impressed upon a counter 11 and a one-shot multivibrator 12. A gating circuit 13 receives inputs from counter 11 and one-shot 12, and produces pulses on output leads 14, 15, 16, 17, 18 and 19.

Turbine meters 20, 21, 22, 23, 24 and 25 are provided. Pulse insertion circuits 26, 27, 28, 29, 30 and 31 receive inputs from turbine meters 20, 21, 22, 23, 24 and 25, respectively. Circuit 26 is also connected from leads 14 and 17. Circuit 27 is connected from leads 15 and 18. Circuit 28 is connected from leads 16 and 19. Circuit 29 is connected from leads 17 and 14. Circuit 30 is connected from leads 15 and 18. Circuit 31 is connected from leads 16 and 19. All of the circuits 26–31 also receive an input from an auxiliary power supply 32 over a lead 33. A main power supply 34 is connected to auxiliary power supply 32. Auxiliary power supply 32 has outputs 35 and 36 which are both connected to a counter 37. A NOR gate 38 is connected from the outputs of all of the circuits 26–31 to the counter 37. An indicator 39 is connected from counter 37. Each of the leads 14–19 has a pulse train hereon which is of a frequency approximately equal to 75/6 kilohertz or 12.5 kilohertz. The pulse train on lead 15 follows the pulse train on lead 14 by a delay equal to the reciprocal 75 kilohertz, which is equal to about 13.3 microseconds. Similarly, the pulse train on lead 16 is delayed behind the pulse train on lead 15 by 13.3 microseconds, etc.

Oscillator 10 is a conventional oscillator.

Figure 2:
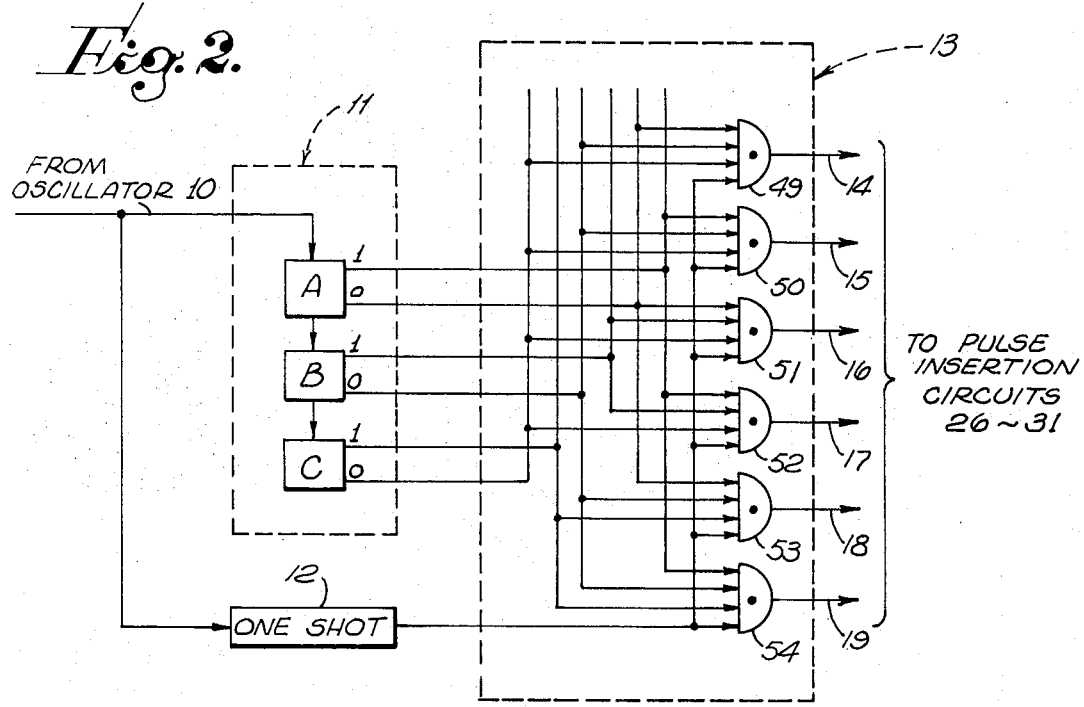
FIG. 2 is a more detailed block diagram of three of the blocks shown in FIG. 1.

Counter 11 is also conventional, and as shown in FIG. 2, includes flip-flops A, B and C. One-shot 12 is also again shown in FIG. 2. Counter 11 counts as illustrated in FIG. 3 where the input is the output of oscillator 10, and A, B and C are the 1 outputs of flip-flops A, B and C. Reset takes place at times 41 and 42. Counter 11 thus has six stable states indicated at 43, 44, 45, 46, 47 and 48 in FIG. 3.

As shown in FIG. 2, gating circuit 13 includes AND gates 49, 50, 51, 52, 53 and 54. All of the AND gates 49–54 have various inputs from the various 1 and 0 outputs of the flip-flops A, B and C. Each of the AND gates 49–54 also has an input from the output of one-shot 12. If the AND gates 49–54 did not have any inputs from the one-shot 12, the outputs of gates 49–54 would be as indicated at $b$, $c$, $d$, $e$, $f$ and $g$ in FIG. 4. The letter $a$ in FIG. 4 is the same waveform as the input in FIG. 3.

The output of one-shot 12 is indicated at $h$ in FIG. 4. The outputs of AND gates 49, 50, 51, 52, 53 and 54 are thus illustrated at $i$, $j$, $k$ $l$, $m$, and $n$ in FIG. 4.

Each pulse in waveforms $i$–$n$ is, of course, repeated at the 12.5 kilohertz pulse repetition frequency (PRF).

Each of the pulse insertion circuits 26–31 is identical to the others. Thus, only one pulse insertion circuit will be described.

Pulse insertion circuit 26 is shown in FIG. 5 inlcuding a conventional RS flip-flop 55 which is connected from turbine meter 20 to a NAND gate 56. The NAND gate 56 also has another input from lead 14. NAND gate 56 is connected to the input of a JK flip-flop 57 through an inverter 58. Another JK flip-flop 59 is provided having its input connected from the A output of flip-flop 57. The JK inputs of flip-flops 57 and 59 are connected to potential +V through a resistor 60. A circuit 61 is provided for resetting all of the flip-flops 55, 57 and 59. All of these three flip-flops may be entirely conventional.

The resetting circuit 61 includes a NAND gate 62 having inputs from the B output of flip-flop 59 and from the A output of flip-flop 57. The output of NAND gate 62 is connected to the input of a NOR gate 63 that also has another input connected from the auxiliary power supply lead 33. The output of NOR gate 63 is impressed upon all of the reset inputs of all the flip-flops.

An output NAND gate 65 receives one input from the A output of flip-flop 57, another input from the $\overline{B}$ output of the flip-flop 59 and a third input from on lead 17. The output of NAND gate 65 is connected to NOR gate 38, shown in FIG. 1.

Figure 6:
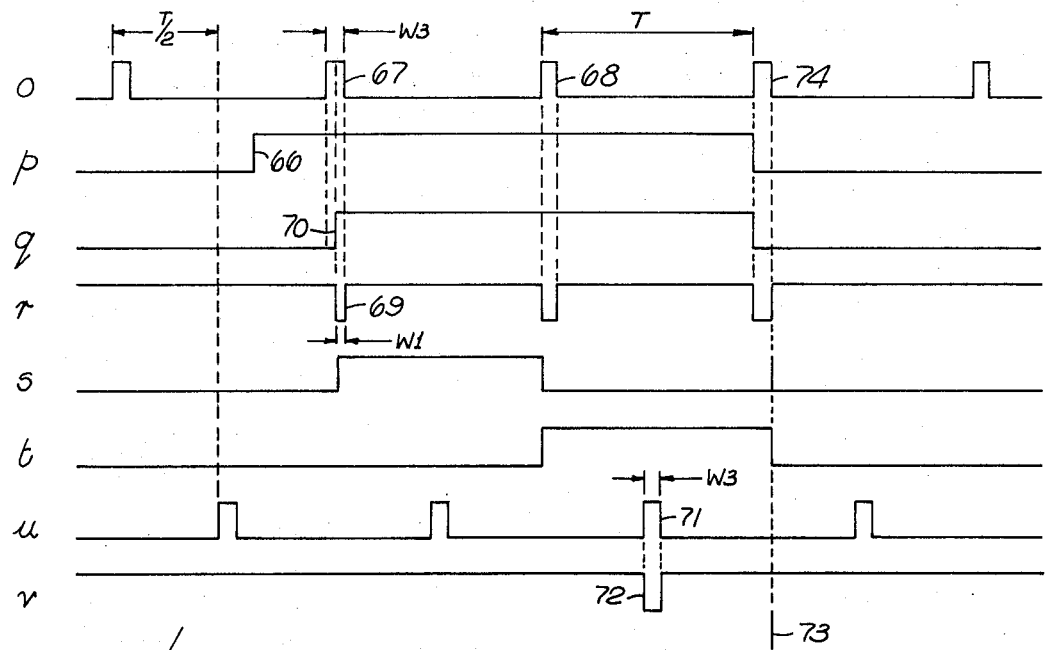
FIG. 6 is a graph of a group of waveforms characteristic of the operation of the circuit shown in FIG. 5.

Flip-flop 55 acts as a one bit storage for the turbine meter pulses. Flip-flops 57 and 59 act as a counter which has four stable states, but which resets itself when the A and B outputs of flip-flops 57 and 59 are high. In FIG. 6, T is the reciprocal of 12,500, in seconds. However, the use of the 75 kilohertz oscillator 10 is by no means critical. This frequency was selected to give ample pulses on leads 14–19 to accomplish the purpose to be described. The maximum expected PRF at the output of any known turbine meter is estimated to be about 2 kilohertz.

In FIG. 6, $o$ is the waveform on lead 14 introduced to NAND gate 56 in FIG. 5. Assume that flip-flop 55 produces a high output at 66 in FIG. 6. In this case, NAND gate 56 is free to pass any one of the whole pulses, for example, indicated at 67 and 68. However, the pulse input to flip-flop 55 from turbine meter 20 is a synchronous with the pulses appearing on lead 14. This means that NAND gate 56 may produce a pulse 69 of a small width W1, where the leading edge 70 showing the output of flip-flop 55 occurs at some point intermediate the leading and trailing edges of pulse 67.

Thus, the width W1 of pulse 69 can be so small as to cause instability or ambiguity in the count. The circuit of FIG. 5 overcomes this problem as follows.

$s$ represents the output A of flip-flop 57 when pulse 69 is generated. The waveform $t$ represents the B output of flip-flop 59. The waveform $u$ is the waveform appearing on lead 17, shown in FIG. 1. Note that lead 17, as well as lead 14, are connected to circuit 26. The output of gate 65, in FIG. 5, is then coincident with pulse 71 in waveform $u$ and is indicated at 72 in FIG. 6. Note that the pulse width of the pulse 72 is W2, and that the pulse width of the pulse 71 is W3, where W2 equals W3.

All three flip-flops 55, 57 and 59 are reset at times 73, shown in FIG. 6, upon receipt of pulse 74 in waveform $o$.

Figure 7:
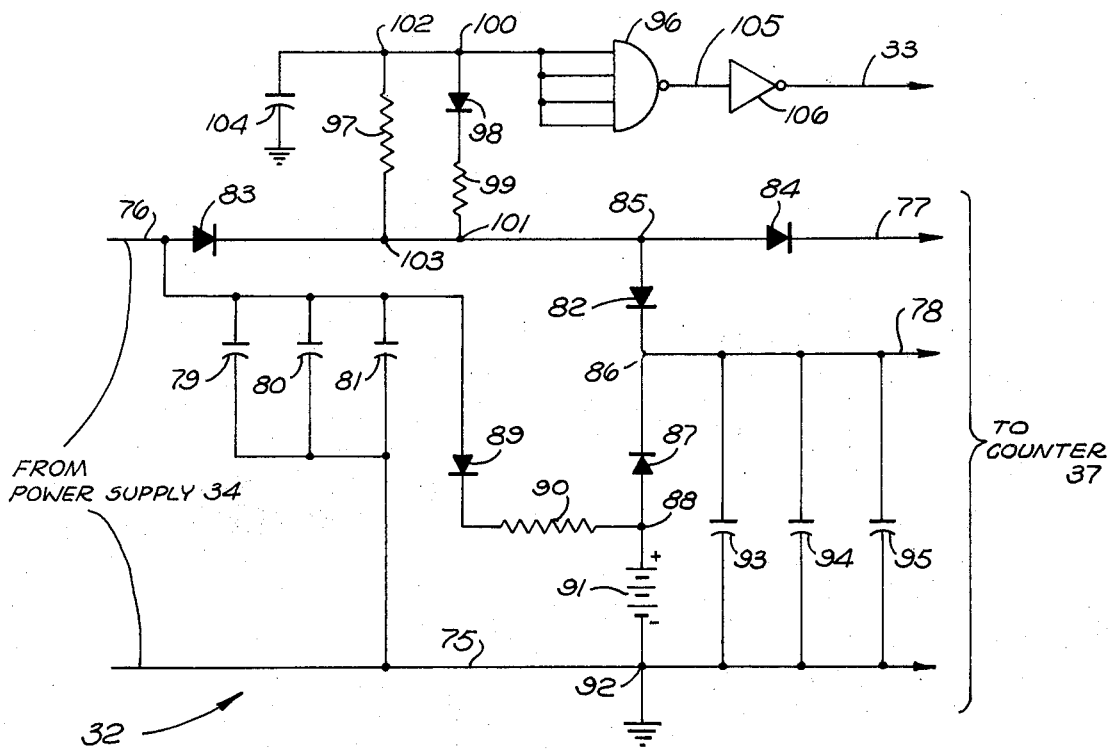
FIG. 7 is a schematic diagram of an auxiliary power supply shown in FIG. 1.

As shown in FIG. 7, auxiliary power supply 32 is shown including a grounded or common lead 75, a main power input lead 76, a main power output lead 77 and an auxiliary power output lead 78. Capacitors 79, 80 and 81 are connected in parallel with each other from lead 76 to lead 75. A diode 83 is connected between lead 76 and a junction 85. Another diode 82 is connected in series from junction 85 to a junction 86. A diode 87 is connected between a junction 88 and a junction 86, and poled to be conductive in a direction toward junction 86. A diode 89 and a resistor 90 are connected in series in that order from junction 76 to junction 88, diode 89 being poled to be conductive in a direction away from junction 76. A diode 84 is connected between junction 85 and a lead 77 and poled for current to flow towards lead 77.

A battery 91 is connected between junction 88 and a junction 92 with lead 75, the positive pole of battery 91 being connected to junction 88.

Capacitors 93, 94 and 95 are all connected between leads 78 and 75. A Schmitt trigger 96 is connected from lead 76 via diode 83 and a resistor 97. Resistor 97 is connected between junctions 102 and 103. Junctions 100 and 102 are connected together. Junctions 85, 101 and 103 are also connected together. A diode 98 and a resistor 99 are connected in series in that order from junction 100 to junction 101. A capacitor 104 is connected from junction 102 to ground. The output of Schmitt trigger 96 is connected to a lead 105. An inverter 106 is connected from lead 105 to each of the circuits 26 to 31, inclusive, over lead 33. The output of inverter 106 is an inverted Power On signal, P. It is high when power is continuously on.

OPERATION

In operation, pulse trains are produced on leads 14–19 as indicated at $i$–$n$ in FIG. 4. For example, in waveform $i$, the pulse is repeated at 12.5 kilohertz. The same is true for each pulse in each of the waveforms $j$–$n$ in FIG. 4. When turbine meter 20, for example, impresses a pulse upon flip-flop 55 in FIG. 5, the pulses on lead 14 continue to operate flip-flops 57 and 59 through NAND gate 56. The flip-flops 57 and 59 are initially set to zero and change in state as indicated at $s$ and $t$ in FIG. 6. Note that the output at 69 of NAND gate 56 sets flip-flop 57 to the 1 state, and that both flip-flops change state on the reception of pulse 68, shown in FIG. 6. Soon after, for example, about 26.6 microseconds minus W3 later, pulse 71 occurs and causes NAND gate 65 to operate. The output of NAND gate 65 is then indicated at $v$ in FIG. 6.

Note will be taken that it is the third 75 kilohertz pulse after the first that enters the count into the NOR gate 38, shown in FIG. 1. That is why both leads 14 and 17 are connected to pulse insertion circuit 26 in FIG. 1. The same is true of leads 15 and 18 regarding circuit 27, leads 16 and 19 regarding circuit 28, etc. Once lead 17 is reached, it is necessary to jump back to lead 14. See the inputs to pulse insertion circuit 30. From lead 19, a jump is made back to lead 16. See the inputs to pulse insertion circuit 31.

In FIG. 5, note that there is an input lead 200, and an output lead 201. Were the circuit in FIG. 5 the circuit 27, lead 200 would be connected from lead 15, and lead 201 would be connected from lead 18, and so forth.

Turbine meters 20–25 are entirely conventional and produce output pulses directly proportional to the rate of volume flow in an oil or gas line, i.e., in respective oil or gas lines.

Counter 37 is entirely conventional. The same is true of indicator 39. If desired, counter 37 may be a binary counter. In this case, indicator 39 may be a row of lamps, each of which is illuminated when the 1 output of each corresponding binary stage in the counter 37 is high.

The phrase "NAND gate" is hereby defined to include an AND gate with any modifications, if necessary. The converse is also true.

The phrase "NOR gate" is hereby defined to include an OR gate with any modifications, if necessary. The converse is also true.

The phrase "utilization means" is hereby defined to include, but not be limited to, a process controller, an indicator or otherwise.

Any number of turbine meters may be employed in accordance with the present invention. For example, in the general case, where n is equal to 2 or more, the turbine meters 20–25 or any number thereof may be described as first, second . . . $n^{th}$ asynchronous primary sources of first, second . . . $n^{th}$ respective series of pulses.

Note will be taken that the number of outputs required from gating circuit will change depending upon the number of turbine meters employed. Thus, oscillator 10, counter 11, one-shot 12 and gating circuit 13 may all be described as a secondary source of first, second . . . $n^{th}$ synchronous pulse trains, each of the pulse trains being of the same frequency, $f$. In this case, the pulse width of each pulse at the outputs of gating circuit 13 will then be no greater than $1/nf$. In all cases, the frequency, $f$, being greater than the maximum expected frequency of the output pulses of the fastest turbine meter. This maximum expected frequency may be defined as $f_m$.

In accordance with the foregoing, the said secondary source may be described as having first, second . . . $n^{th}$ outputs for the outputs on leads 14–19 or any number thereof. The said outputs may be described as having first, second . . . $n^{th}$ pulse trains impressed thereon, respectively, each one of the pulse trains being shifted in phase with respect to one prior by $1/nf$, the $n^{th}$ pulse train being shifted in phase from the $n-1^{st}$ pulse train by $1/nf$, the first train being shifted in phase from the $n^{th}$ pulse train by $1/nf$.

In accordance with the foregoing, note will be taken that if the number of turbine meters are varied, the number of pulse insertion circuits will also be varied. They, therefore, may be described as first, second . . . $n^{th}$ pulse insertion circuits.

Note will be taken that reset circuit 61 resets all of the flip-flops 55, 57 and 59 on the condition $P + AB$, where P is the output signal of inverter 106 appearing at line 33 in FIG. 7.

In FIG. 5, the logic of NAND gate 65 is $\overline{ABCL}$, where CL is the high condition of the pulse on lead 201, shown in FIG. 5. Expressed generally for any number of a plurality of pulse insertion circuits, CL is the pulse generated at the $n-1^{st}$ output for the first circuit, the $n^{th}$ output for the second circuit, the first output for the third circuit . . . the $n-3^{rd}$ output for the $n^{th}$ circuit and so forth.

What is claimed is:

1. Pulse train forming apparatus comprising: first, second . . . $n^{th}$ asynchronous primary sources of first, second . . . $n^{th}$ respective series of pulses, $n$ being a positive integer larger than unity, a secondary source of first, second . . . $n^{th}$ synchronous pulse trains, each of said pulse trains being of the same frequency, $f$, the pulse width of each pulse in each train being no greater than $1/nf$, f being greater than the maximum expected frequency, $f_m$, of the pulses produced by said primary sources, said secondary source having first, second . . . $n^{th}$ outputs having said first, second . . . $n^{th}$ pulse trains impressed thereon, respectively, each one of said first, second . . . $n^{th}$ pulse trains being shifted in phase with respect to one prior by $1/nf$, the $n^{th}$ pulse train being shifted in phase from the $n-1^{st}$ pulse train by $1/nf$, the first pulse train being shifted in phase from the $n^{th}$ pulse train by $1/nf$; first, second . . . $n^{th}$ pulse insertion circuits connectd from said first, second . . . $n^{th}$ primary sources, respectively, and from said first, second . . . $n^{th}$ outputs of said secondary source, respectively, each pulse insertion circuit including first means to store a pulse from a corresponding primary source, and second means connected from a corresponding secondary source output and from said first means to generate a pulse substantially coincident with and of substantially the same time width as a complete pulse from said corresponding secondary source output received after said storage; a NOR gate connected from the outputs of all of said circuits; a pulse counter connected from the output of said NOR gate; and utilization means connected from said counter, said utilization means including means to indicate the count stored in said counter; main and auxiliary power supplies, said auxiliary supply including signal means to connect the same automatically to said counter upon failure of said main supply, said signal means being connected to said first means to reset the same when said main power supply is restored to working order.

2. Pulse train forming apparatus comprising: first, second . . . $n^{th}$ asynchronous primary sources of first, second . . . $n^{th}$ respective series of pulses, $n$ being a positive integer larger than unity, a secondary source of first, second . . . $n^{th}$ synchronous pulse trains, each of said pulse trains being of the same frequency, $f$, the pulse width of each pulse in each train being no greater than $1/nf$, $f$ being greater than the maximum expected frequency, $f_m$, of the pulses produced by said primary sources, said secondary source having first, second . . . $n^{th}$ outputs having said first, second . . . $n^{th}$ pulse trains impressed thereon, respectively, each one of said first, second . . . $n^{th}$ pulse trains being shifted in phase with respect to one prior by $1/nf$, the $n^{th}$ pulse train being shifted in phase from the $n-1^{st}$ pulse train by $1/nf$, the first pulse train being shifted in phase from the $n^{th}$ pulse train by $1/nf$; first, second . . . $n^{th}$ pulse insertion circuits connected from said first, second . . . $n^{th}$ primary sources, respectively, and from said first, second . . . $n^{th}$ outputs of said secondary source, respectively, each pulse insertion circuit including first means to store a pulse from a corresponding primary source, and second means connected from a corresponding secondary source output and from said first means to generate a pulse substantially coincident with and of substantially the same time width as a complete pulse from said corresponding secondary source output received after said storage; a NOR gate connected from the outputs of all of said circuits; a pulse counter connected from the output of said NOR gate; and utilization means connected from said counter; main and auxiliary power supplies, said auxiliary supply including signal means to connect the same automatically to said counter upon failure of said main supply, said signal means being connected to said first means to reset the same when said main power supply is restored to working order.

3. Pulse train forming apparatus comprising: first, second . . . $n^{th}$ asynchronous primary sources of first, second . . . $n^{th}$ respective series of pulses, $n$ being a positive integer larger than unity, a secondary source of first, second . . . $n^{th}$ synchronous pulse trains, each of said pulse trains being of the same frequency, $f$, the pulse width of each pulse in each train being no greater than $1/nf$, f being greater than the maximum expected frequency, $f_m$, of the pulses produced by said primary sources, said secondary source having first, second . . . $n^{th}$ outputs having said first, second . . . $n^{th}$ pulse trains impressed thereon, respectively, each one of said first, second . . . $n^{th}$ pulse trains being shifted in phase with respect to one prior by $1/nf$, the first pulse train being shifted in phase from the $n^{th}$ pulse train by $1/nf$; first, second . . . $n^{th}$ pulse insertion circuits connected from said first, second . . . $n^{th}$ primary sources, respectively, and from said first, second ... $n^{th}$ outputs of said secondary source, respectively, each pulse insertion circuit including first means to store a pulse from a corresponding primary source, and second means connected from a corresponding secondary source output and from said first means to generate a pulse substantially coincident with and of substantially the same time width as a complete pulse from said corresponding secondary source output received after said storage; a NOR gate connected from the outputs of all of said circuits; a pulse counter connected from the output of said NOR gate; utilization means connected from said counter, each pulse insertion circuit including a first flip-flop connected from a corresponding primary source, a NAND gate connected from the first flip-flop and from one corresponding secondary source output, at least a second flip-flop connected from said NAND gate, and means connected from said second flip-flop and from another corresponding secondary source output different from said out output thereof to impress a pulse on gate of a time width and at a time of occurrence the same as that of a pulse appearing at said other output.

4. Pulse train forming apparatus comprising: first, second ... $n^{th}$ asynchronous primary sources of first, second ... $n^{th}$ respective series of pulses, $n$ being a positive integer larger than unity, a secondary source of first, second ... $n^{th}$ synchronous pulse trains, each of said pulse trains being of the same frequency, $f$, the pulse width of each pulse in each train being no greater than $1/nf$, $f$ being greater than the maximum expected frequency, $f_m$, of the pulses produced by said primary sources, said secondary source having first, second ... $n^{th}$ outputs having said first, second ... $n^{th}$ pulse trains impressed thereon, respectively, each one of said first, second ... $n^{th}$ pulse trains being shifted in phase with respect to one prior by $1/nf$, the $n^{th}$ pulse train being shifted in phase from the $n - 1^{st}$ pulse train by $1/nf$; first, second ... $n^{th}$ pulse insertion circuits connected from said first, second ... $n^{th}$ primary sources, respectively, and from said first, second ... $n^{th}$ outputs of said secondary source, respectively, each pulse insertion circuit including first means to store a pulse from a corresponding primary source, second means connected from a corresponding secondary source output and from said first means to generate a pulse substantially coincident with and of substantially the same time width as a complete pulse from said corresponding secondary source otuput received after said storage; a NOR gate connected from the outputs of all of said circuits; a pulse counter connected from the outputs of said NOR gate; utilization means connected from said counter, said utilization means including means to indicate the count stored in said counter; main and auxiliary power supplies, said auxiliary supply including signal means to connect the same automatically to said counter upon failure of said main supply, said signal being connected to said first means to reset the same when said main power supply is restored to working order; $n = 6$, $f$ being greater than $6f_m$, each insertion circuit including a first flip-flop to receive each pulse of a corresponding series, a first NAND gate connected from a corresponding secndary source output and from the output of said first flip-flop, first and second JK flip-flops, a first inverter connected from the output of said first NAND gate to the set input of said first JK flip-flop, the A output of said first JK flip-flop being connected to the set input of said second JK flip-flop, means connected from the A and B outputs of said first and second JK flip-flops, respectively, and from aid signal means to reset said first, and said first and second JK flip-flops on the logical condition $P + AB$ where $P$ is high when the main power is on, and a second NAND gate having the logic $A\overline{B}CL$ and an output connected to an input of said NOR gate, where CL is the pulse generated at the $n - 1^{st}$ output for said first circuit, the $n^{th}$ output for said second circuit, the first output for the third circuit ... the $n - 3^{rd}$ output for the $n^{th}$ circuit, and so forth.

* * * * *